US012545016B2

(12) United States Patent
Kamada et al.

(10) Patent No.: US 12,545,016 B2
(45) Date of Patent: Feb. 10, 2026

(54) SURFACE PROTECTION FILM

(71) Applicant: BANDO CHEMICAL INDUSTRIES, LTD., Hyogo (JP)

(72) Inventors: Yutaka Kamada, Hyogo (JP); Kazumi Sakano, Hyogo (JP)

(73) Assignee: BANDO CHEMICAL INDUSTRIES, LTD., Hyogo (JP)

( * ) Notice: Subject to any disclaimer, the term of this patent is extended or adjusted under 35 U.S.C. 154(b) by 974 days.

(21) Appl. No.: 16/980,418

(22) PCT Filed: Mar. 14, 2019

(86) PCT No.: PCT/JP2019/010441
§ 371 (c)(1),
(2) Date: Sep. 13, 2020

(87) PCT Pub. No.: WO2019/177074
PCT Pub. Date: Sep. 19, 2019

(65) Prior Publication Data
US 2021/0001612 A1 Jan. 7, 2021

(30) Foreign Application Priority Data

Mar. 14, 2018 (JP) .................... 2018-046865

(51) Int. Cl.
*B32B 27/20* (2006.01)
*B32B 7/06* (2019.01)
(Continued)

(52) U.S. Cl.
CPC ............. *B32B 27/26* (2013.01); *B32B 7/06* (2013.01); *B32B 7/12* (2013.01); *B32B 27/20* (2013.01);
(Continued)

(58) Field of Classification Search
CPC .. B32B 27/26; B32B 7/06; B32B 7/12; B32B 27/20; B32B 27/24; B32B 27/40;
(Continued)

(56) References Cited

U.S. PATENT DOCUMENTS

2003/0148111 A1* 8/2003 Haruta ................. C09D 175/04
428/423.1
2006/0127666 A1* 6/2006 Fuchs ........................ C09J 7/29
428/323
(Continued)

FOREIGN PATENT DOCUMENTS

CN 101522417 9/2009
CN 106103526 11/2016
(Continued)

OTHER PUBLICATIONS

McKeen, Laurence W., "Environmentally Friendly Polymers", 2012, Permeability Properties of Plastics and Elastomers, p. 287 (Year: 2012).*

(Continued)

*Primary Examiner* — Callie E Shosho
*Assistant Examiner* — Steven A Rice
(74) *Attorney, Agent, or Firm* — JCIPRNET

(57) ABSTRACT

The present invention addresses the problem of providing a surface protection film having superior oil resistance. Provided is a surface protection film having a coating layer obtained by curing an isocyanate compound, on one surface of a protection layer formed of a polyurethane.

8 Claims, 2 Drawing Sheets

(51) Int. Cl.
  *B32B 7/12* (2006.01)
  *B32B 27/24* (2006.01)
  *B32B 27/26* (2006.01)
  *B32B 27/40* (2006.01)
  *C08G 18/32* (2006.01)
  *C08G 18/73* (2006.01)
  *C08G 18/76* (2006.01)
  *C09D 175/06* (2006.01)

(52) U.S. Cl.
  CPC .............. *B32B 27/24* (2013.01); *B32B 27/40* (2013.01); *C08G 18/3206* (2013.01); *C08G 18/73* (2013.01); *C08G 18/76* (2013.01); *C09D 175/06* (2013.01); *B32B 2250/04* (2013.01); *B32B 2250/05* (2013.01); *B32B 2255/10* (2013.01); *B32B 2264/1021* (2020.08); *B32B 2264/30* (2020.08); *B32B 2307/412* (2013.01); *B32B 2307/584* (2013.01); *B32B 2307/732* (2013.01); *B32B 2375/00* (2013.01); *B32B 2405/00* (2013.01); *B32B 2457/208* (2013.01)

(58) Field of Classification Search
  CPC ............ B32B 2250/04; B32B 2250/05; B32B 2255/10; B32B 2264/1021; B32B 2264/30; B32B 2307/412; B32B 2307/584; B32B 2307/732; B32B 2375/00; B32B 2405/00; B32B 2457/208; B32B 2250/03; B32B 2250/24; B32B 27/08; B32B 27/325; B32B 27/36; B32B 2255/20; B32B 2255/26; B32B 27/365; B32B 2250/02; B32B 2307/538; B32B 2571/00; B32B 27/281; B32B 2307/756; C08G 18/3206; C08G 18/73; C08G 18/76; C08G 18/10; C08G 18/246; C08G 18/307; C08G 18/755; C08G 18/7664; C08G 18/82; C08G 18/44; C09D 175/06; C09J 7/25; C09J 7/29; C09J 7/38; C09J 7/40; C09J 201/00

USPC ...................................................... 428/423.1
  See application file for complete search history.

(56) References Cited

U.S. PATENT DOCUMENTS

2010/0032082 A1    2/2010  Ho et al.
  2012/0160402 A1    6/2012  Ho et al.
  2014/0302308 A1*  10/2014  Ho ........................... C08J 7/042
                                                          428/323
  2017/0107398 A1    4/2017  Ho et al.
  2019/0160797 A1*   5/2019  Sakairi .................... B32B 27/28
  2019/0225834 A1    7/2019  Ho et al.
  2019/0284329 A1*   9/2019  Niegemeier ....... C08G 18/7664
  2019/0375879 A1*  12/2019  Oikawa .................... C08J 5/043

FOREIGN PATENT DOCUMENTS

JP     H05125671           5/1993
  JP     H11-048695  A    *  2/1999
  JP     2001129915           5/2001
  JP     2010212243           9/2010
  KR     10-0719855  B1   *  5/2007
  KR     101814178   B1   *  1/2018  ......... B29C 47/0064
  WO     2017094480           6/2017
  WO     2018025895           2/2018
  WO     2018038069           3/2018

OTHER PUBLICATIONS

Machine translation of KR 10-1814178 B1 (Year: 2018).*
  Machine translation of JP H11-048695 A (Year: 1999).*
  Machine translation of KR 10-0719855 B1 (Year: 2007).*
  "Office Action of China Counterpart Application", issued on Dec. 21, 2021, with English translation thereof, p. 1-p. 16.
  "Written Opinion of the International Searching Authority (Form PCT/ISA/237)" of PCT/JP2019/010441, mailed on Jun. 4, 2019, with English translation thereof, pp. 1-7.
  "International Search Report (Form PCT/ISA/210) of PCT/JP2019/010441," mailed on Jun. 4, 2019, with English translation thereof, pp. 1-3.

* cited by examiner

SURFACE PROTECTION FILM

CROSS-REFERENCE TO RELATED APPLICATION

This application is a 371 application of the international PCT application serial no. PCT/JP2019/010441, filed on Mar. 14, 2019, which claims the priority benefit of Japan application no. 2018-046865, filed on Mar. 14, 2018. The entirety of each of the above-mentioned patent applications is hereby incorporated by reference herein and made a part of this specification.

BACKGROUND OF THE INVENTION

Technical Field

The present invention relates to a surface protection film for protecting a transparent substrate on a display surface.

Background Art

In electronic devices including a display such as smartphones, tablet PCs, and portable music players, in order to protect a transparent substrate on a display surface, a surface protection film is adhered thereon in some cases. Light transmission properties, non-coloring properties, weather resistance, plasticizer resistance, antifouling properties, and the like are required for the surface protection film. In addition, in recent years, these electronic devices have been generally operated through a capacitance touch panel, and a feeling of writing with a touch pen, operability, scratch resistance, self-repairing properties for restoring a film pushed by a tip of a touch pen to its original state over time, and the like have been additionally required.

As such a surface protection film, in Patent Literature 1, the applicants have proposed a surface protection film in which three layers including a protection layer formed of thermosetting polyurethane which is a cured product of a polyether polyol, an aliphatic isocyanate, an alcohol-based curing agent, and a non-amine catalyst, a transparent substrate film, and an adhesive agent layer are laminated in that order. In addition, although it has not been published at the time of filing this application, in Patent Literature 2, the applicants have proposed a surface protection film in which three layers including a protection layer formed of polycarbonate polyurethane, a transparent substrate film, and an adhesive agent layer are laminated in that order.

Since the surface protection film is operated with a finger, various oil components from the finger such as sebum, edible oils, cosmetics, and hand cream adhere thereto. Since the oil components that adhere to the surface protection film may remain on the surface protection film for a long time without being wiped off in some cases, high oil resistance is required for the surface protection film.

CITATION LIST

Patent Literature

Patent Literature 1
  PCT International Publication No. WO 2017/094480
Patent Literature 2
  PCT International Publication No. WO 2018/038069

SUMMARY

Technical Problem

An issue of the present invention is to provide a surface protection film having excellent oil resistance.

Solution to Problem

In order to solve the above issue, the present invention has the following configurations.
1. A surface protection film having a coating layer formed by curing an isocyanate compound on one surface of a protection layer formed of polyurethane.
2. The surface protection film according to 1,
   wherein the coating layer contains inorganic fine particles.
3. The surface protection film according to 1 or 2,
   wherein the isocyanate compound contains a polyfunctional isocyanate.
4. The surface protection film according to any one of 1 to 3,
   wherein the isocyanate compound contains an aromatic isocyanate.
5. The surface protection film according to any one of 1 to 4,
   wherein a transparent substrate film formed of a resin other than polyurethane is provided on the other surface of the protection layer.
6. The surface protection film according to any one of 1 to 5,
   wherein the polyurethane is polycarbonate polyurethane or polyester polyurethane.
7. The surface protection film according to any one of 1 to 6,
   wherein the protection layer has a thickness of 50 µm or more and 400 µm or less.
8. A surface protection film laminate in which a mold release film is laminated on the surface on the side of the coating layer of the surface protection film according to any one of 1 to 7 and a release film is laminated on the other surface.
9. A method of producing a surface protection film in which at least two layers including a coating layer formed by curing an isocyanate compound and a protection layer formed of polyurethane are laminated in that order, wherein the method includes:
   pouring a material composition into a gap between first and second gap maintaining members that are continuously conveyed by a pair of rollers which are disposed apart from each other;
   thermally curing the material composition while the material composition is held between the first and second gap maintaining members to form the protection layer; and
   peeling off one of the first and second gap maintaining members, applying a coating solution containing an isocyanate compound to an exposed surface of the protection layer, and curing the isocyanate compound to form a coating layer.
10. The method of producing a surface protection film according to 9,
    wherein the other of the first and second gap maintaining members is a film on which no mold release treatment is performed, and one thereof is a film on which a mold release treatment is performed.

11. The method of producing a surface protection film according to 9 or 10,
wherein one of the first and second gap maintaining members is a film having unevenness, and holding the material composition by the surface having the unevenness.

Advantageous Effects of Invention

A surface protection film of the present invention has a coating layer obtained by curing an isocyanate compound on the surface and has excellent oil resistance. The surface protection film of the present invention is unlikely to undergo swelling or discoloration even if oil components such as sebum, edible oils, cosmetics, and hand cream adhere to it for a long time.

The surface protection film of the present invention in which the coating layer contains inorganic fine particles has more excellent oil resistance. In addition, the coating layer obtained by curing an isocyanate compound containing a polyfunctional isocyanate and an aromatic isocyanate has more excellent oil resistance.

The protection layer formed of polycarbonate polyurethane has excellent plasticizer resistance, and the protection layer formed of polyester polyurethane has excellent plasticizer resistance and oil resistance. Therefore, the protection film using the protection layer formed of these polyurethanes has more excellent oil resistance.

The surface protection film of the present invention in which the protection layer has a thickness of 50 µm or more and 400 µm or less satisfies optical characteristics that can be used as a surface protection film and also has excellent self-repairing properties and feeling of writing with a touch pen. In addition, the surface protection film of the present invention in which unevenness are formed on the outermost surface of the protection layer has anti-glare properties.

In a surface protection film laminate in which a mold release film and a release film are laminated on the surface protection film of the present invention, a coating layer and an adhesive agent layer are protected, and handling properties are excellent.

According to the production method of the present invention, it is possible to continuously produce the protection layer and the coating layer. In addition, a protection layer having a thickness of 50 µm or more and 400 µm or less which is not easily produced in a wet coating method can be produced without optical characteristics deteriorating. In addition, according to a transfer method, it is possible to easily form unevenness on a surface of the protection layer.

REFERENCE SIGNS LIST

Figure 1:
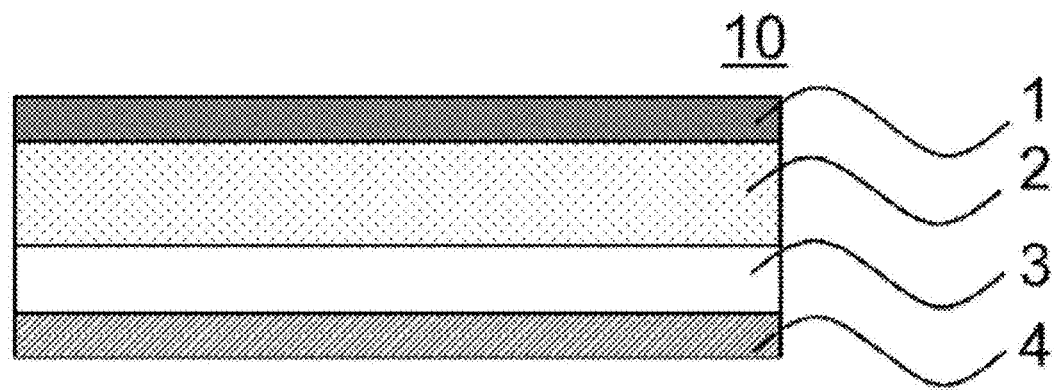
FIG. 1 is a diagram showing a surface protection film according to an embodiment of the present invention.

1 Coating layer
2 Protection layer
3 Transparent substrate film
4 Adhesive agent layer
5 Mold release film
6 Release film
10 Surface protection film
20 Transparent substrate
30 Surface protection film laminate
40 Sheet-like article
40a Material composition
41 Casting machine
41a Head part
42a First gap maintaining member
42b Second gap maintaining member
43a Transport roller
43b Transport roller
44 Transport roller
45 Auxiliary roller
46 Heating device
47 Conveyor belt

DESCRIPTION OF THE EMBODIMENTS

Figure 2:
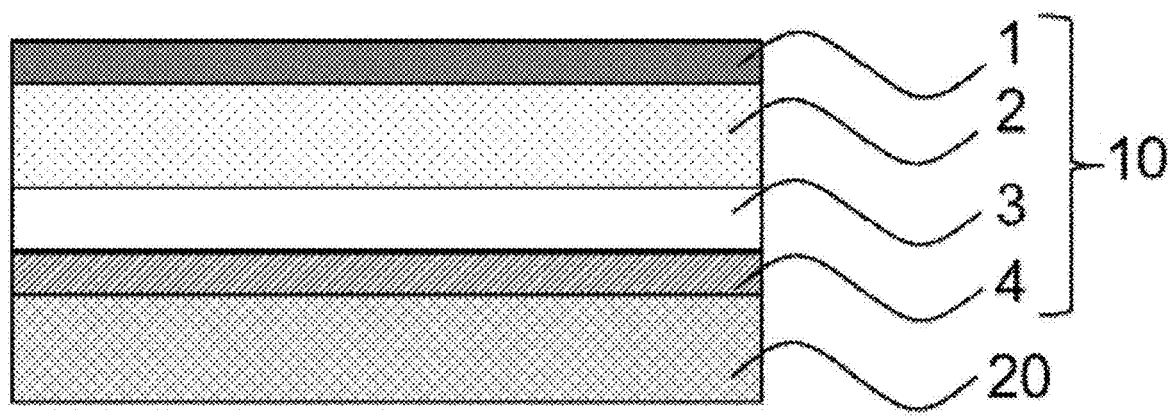
FIG. 2 is a diagram showing a state in which a surface protection film according to an embodiment of the present invention is adhered on a transparent substrate on a display surface.

FIGS. 1 and 2 show a surface protection film according to an embodiment of the present invention and a state in which the surface protection film according to the embodiment is adhered on a transparent substrate positioned on a display surface, respectively. Here, in FIGS. 1 and 2, the thicknesses of each layer do not reflect actual thicknesses.

In a surface protection film 10 according to an embodiment, four layers including a coating layer 1, a protection layer 2 formed of polyurethane, a transparent substrate film 3, and an adhesive agent layer 4 are laminated in that order. In addition, the surface protection film 10 according to the embodiment is adhered on a transparent substrate 20 with the adhesive agent layer 4 therebetween.

In this manner, the surface protection film of the present invention is attached to a surface of the transparent substrate, and thus prevents scratches, cracks, contamination, and the like on the transparent substrate.

"Protection Layer"

The protection layer is formed of polyurethane. The polyurethane is obtained by reacting a material composition containing at least a polyol, an isocyanate and an alcohol-based curing agent.

a. Polyol

Regarding the polyol, polyoxyalkylene glycols such as polyethylene glycol, polypropylene glycol, and polyoxytetramethylene glycol or polyether polyols which are alkylene oxide (such as ethylene oxide, and propylene oxide) adducts of bisphenol A, and glycerin; polyester-based polyols obtained by a polymerization reaction of a dibasic acid such as adipic acid, phthalic anhydride, isophthalic acid, maleic acid, and fumaric acid and glycols such as ethylene glycol, propylene glycol, 1,4-butanediol, 1,6-hexanediol, and trimethylolpropane; polycaprolactone polyols such as polycaprolactone glycol, polycaprolactone triol, and polycaprolactone tetraol; polycarbonate-based polyols such as polycarbonate glycol, polycarbonate triol, and polycarbonate tetraol; and derivatives thereof in which a side chain or a branch structure is introduced thereinto, modified products thereof, a mixture thereof and the like can be exemplified.

Among these, a polycarbonate polyurethane obtained from a polycarbonate-based polyol has excellent plasticizer resistance and can prevent a plasticizer from being transferred to the surface protection film due to contact with a rubber product or the like and swelling thereof. In addition, a polyester polyurethane obtained from a polyester-based polyol has excellent plasticizer resistance and oil resistance, and can prevent a plasticizer and various oil components such as sebum from being transferred into the surface protection film and swelling thereof.

a1. Polycarbonate-Based Polyol

As polycarbonate-based polyols, for example, a reaction product of a dialkyl carbonate and a diol can be exemplified. In addition, as the polycarbonate-based polyol, for example, a polycarbonate glycol, a polycarbonate triol, a polycarbonate tetraol, and derivatives thereof in which a side chain or a branched structure is introduced thereinto, modified products thereof, a mixture thereof, and the like can be used.

As the dialkyl carbonates, for example, a dialkyl carbonate such as dimethyl carbonate and diethyl carbonate, a diaryl carbonate such as diphenyl carbonate, and an alkylene carbonate such as ethylene carbonate can be exemplified. These may be used alone or two or more thereof may be used in combination.

As the diols, for example, ethylene glycol, diethylene glycol, 1,4-butanediol, 1,5-pentanediol, 1,6-hexanediol, 1,7-heptanediol, 1,8-octanediol, 2-methyl-1,8-octanediol, 1,9-nonanediol, 1,10-dodecanediol, 2-ethyl-1,6-hexanediol, 3-methyl-1,5-pentanediol, 2,4-dimethyl-1,5-pentanediol, neopentyl glycol, 1,3-cyclohexanediol, 1,4-cyclohexanediol, 1,4-cyclohexanedimethanol, and 2,2'-bis(4-hydroxycyclohexyl)-propane can be exemplified. These may be used alone or two or more thereof may be used in combination. As the diol, an aliphatic diol or alicyclic diol having 4 to 9 carbon atoms is preferable, for example, preferably, 1,4-butanediol, diethylene glycol, 1,5-pentanediol, 1,6-hexanediol, 3-methyl-1,5-pentanediol, 2,4-dimethyl-1,5-pentanediol, 1,4-cyclohexanedimethanol, 1,7-heptanediol, 1,8-octanediol, 2-methyl-1,8-octanediol, and 1,9-nonanediol are used alone or two or more thereof are used in combination. In addition, those having no branching structures are more preferable.

a2. Polyester-Based Polyol

As polyester-based polyols, for example, polyester-based polyols obtained by a polymerization reaction of a dibasic acid such as succinic acid, adipic acid, phthalic anhydride, isophthalic acid, maleic acid, and fumaric acid, and glycols such as ethylene glycol, propylene glycol, 1,4-butanediol, 1,6-hexanediol, and trimethylolpropane can be exemplified. Among these, a succinic acid ester-based polyurethane using succinic acid as a dibasic acid is particularly preferable because it has excellent plasticizer resistance and oil resistance.

The number-average molecular weight of the polyol is preferably 200 or more and 10,000 or less, more preferably 500 or more and 5,000 or less, and still more preferably 800 or more and 3,000 or less. When the number-average molecular weight is less than 200, a reaction occurs too fast and handling properties deteriorate, and a molded product may lose flexibility and become brittle in some cases. On the other hand, when the number-average molecular weight is greater than 10,000, the viscosity becomes too high and handling properties deteriorate, and a molded product may crystallize and become cloudy in some cases. Here, in the present invention, the number-average molecular weight refers to a molecular weight that is calculated from a hydroxyl value of a polyol measured according to JIS K1557. However, even the values are beyond the above numerical value range, the values will not be excluded as long as they are not deviate from the spirit and scope of the present invention.

b. Isocyanate

As isocyanate, isocyanates having two or more isocyanate groups in a molecule can be used without particular limitation. For example, tolylene diisocyanate, tolidine diisocyanate, diphenylmethane diisocyanate, polymethylene polyphenyl polyisocyanate, carbodiimidated diphenylmethane polyisocyanate, crude diphenylmethane diisocyanate, xylylene diisocyanate, 1,5-naphthalene diisocyanate, tetramethylxylylene diisocyanate, isophorone diisocyanate, hydrogenated diphenylmethane diisocyanate, hydrogenated xylylene diisocyanate, hexamethylene diisocyanate, dimer acid diisocyanate, norbornene diisocyanate, and the like can be used. Among these, two or more types may be used in combination.

In the present invention, in the polyurethane used to form the protection layer, it is preferable that an aliphatic isocyanate having no aromatic ring is used as an isocyanate component. The polyurethane obtained from an aliphatic isocyanate is unlikely to yellow and can prevent the polyurethane from discoloring due to light and heat from a light source, sunlight, and the like and can prevent transparency from deteriorating.

c. Alcohol-Based Curing Agent

In the polyurethane used to form the protection layer of the present invention, an alcohol-based curing agent is used as a curing agent. The alcohol-based curing agent has a weaker adverse effect on human bodies and the environment than an amine-based curing agent.

Any alcohol-based curing agent can be used without particular limitation as long as it has two or more hydroxyl groups in a molecule. For example, dihydric alcohols such as ethylene glycol, 1,3-propanediol, 2-methyl-1,3-propanediol, 1,3-butanediol, 1,4-butanediol, 1,5-pentanediol, neopentyl glycol (2,2-dimethyl-1,3-propanediol), 1,6-hexanediol, polyethylene glycol, polypropylene glycol, polybutylene glycol, cyclohexane dimethanol, and a hydrogenated bisphenol A, trihydric alcohols such as glycerin, trimethylolpropane, butanetriol, pentanetriol, hexanetriol, cyclopentanetriol, and cyclohexanetriol, and trihydric or higher alcohols such as pentaerythritol, dipentaerythritol, and tetramethylolpropane may be exemplified. Among these, regarding the dihydric alcohol, 1,4-butanediol is preferable in consideration of handling properties and mechanical properties, and in consideration of preventing cloudiness, a dihydric alcohol having a cyclic structure such as cyclohexanedimethanol and hydrogenated bisphenol A is preferable. Regarding the trihydric alcohol, trimethylolpropane is preferable in consideration of handling properties and mechanical properties.

When a dihydric alcohol is used alone as an alcohol-based curing agent, the molded product may crystallize and become opaque, and when a trihydric alcohol is used as a main component, the strength may decrease in some cases. Therefore, it is preferable to use a dihydric alcohol and a trihydric alcohol in combination. Specifically, it is preferable to use a dihydric alcohol in a range of 50 to 100 parts by weight, and a trihydric alcohol in a range of 50 to 0 parts by weight, and more preferable to use a dihydric alcohol in a range of 60 to 80 parts by weight and a trihydric alcohol in a range of 40 to 20 parts by weight. Thus, if the molded product becomes cloudy in some cases when 1,4-butanediol is used as a dihydric alcohol, a part or all of 1,4-butanediol may be replaced with a dihydric alcohol having a cyclic structure.

d. Catalyst

Preferably, the polyurethane used to form the protection layer of the present invention is thermally cured in the presence of a non-amine catalyst. By using the non-amine catalyst, it is possible to obtain a polyurethane having excellent non-coloring properties, transparency, and weather resistance. On the other hand, in a polyurethane that is thermally cured in the presence of an amine catalyst, emitted light turns yellow and an appearance becomes colored over time in some cases.

As non-amine catalysts, for example, an organotin compound such as di-n-butyltin dilaurate, dimethyltin dilaurate, dibutyltin oxide, and octane tin, an organic titanium compound, an organic zirconium compound, a carboxylic acid tin salt, carboxylic acid bismuth salt, and the like can be exemplified. Among these, an organotin compound is preferable because in this case a reaction rate is easily adjusted.

0.0005 weight % or more and 3.0 weight % or less of the non-amine catalyst is preferably added with respect to the total amount of the above a. to c. When the proportion is less than 0.0005 weight %, the reaction rate is not sufficiently high, and it is not possible to efficiently obtain a molded product in some cases. When the proportion is higher than 3.0 weight %, the reaction rate is too high, and thus problems may occur, such as for example, it not being possible to obtain a molded product with a uniform thickness, heat resistance and weather resistance of the molded product deteriorating, light transmittance being lowered, and the molded product becoming colored in some cases. However, even the values are beyond the above numerical value range, the values will not be excluded as long as they are not deviate from the spirit and scope of the present invention.

The polyurethane used to form the protection layer can contain various additives such as a colorant, a light stabilizer, a heat stabilizer, an antioxidant, an antifungal agent, and a flame retardant as necessary within a range in which required characteristics are not impaired.

The protection layer is a molded product made of a polyurethane obtained by curing a material composition containing at least a polyol, an isocyanate, and an alcohol-based curing agent with a catalyst, and regarding a molding method thereof, any of a one-shot method, a prepolymer method, and a quasi-prepolymer method may be used.

In the one-shot method, a polyol, an isocyanate, an alcohol-based curing agent, optional additives, and a catalyst are added together and cured, and thereby a polyurethane molded product can be produced.

In the prepolymer method, a polyol and a stoichiometrically excess amount of an isocyanate are reacted to prepare a prepolymer having an isocyanate group at its end in advance, predetermined amounts of an alcohol-based curing agent, optional additives, and a catalyst are mixed thereinto, the prepolymer is cured, and thereby a polyurethane molded product can be produced.

In the quasi-prepolymer method, some of a polyol is mixed with an alcohol-based curing agent in advance, the remaining polyol and an isocyanate are used to prepare a prepolymer, and a mixture in which a polyol, an alcohol-based curing agent, optional additives, and a catalyst are mixed together in advance is mixed thereinto, the mixture is cured, and thereby a polyurethane molded product can be produced.

In the present invention, in the material composition before the polyurethane is thermally cured, a ratio of the number of moles of hydroxyl groups (—OH) included in the alcohol-based curing agent to the number of moles of isocyanate groups (—NCO) of an isocyanate or a prepolymer (—OH/—NCO: hereinafter referred to as an a ratio) is preferably 0.80 or more and 1.50 or less, more preferably 0.90 or more and 1.45 or less, and still more preferably 1.02 or more and 1.4 or less. When the ratio is less than 0.80, mechanical properties are unstable, and when the ratio is greater than 1.50, surface adhesiveness increases, and a favorable feeling of writing is impaired.

In addition, the polyurethane preferably does not have an acrylic skelton (an acrylic skelton or a methacrylic skelton). That is, the polyurethane used to form the protection layer of the present invention preferably does not contain an acrylic modified polyurethane. A polyurethane having an acrylic skelton may impair the flexibility of the polyurethane and lower the mechanical strength such as wear resistance and tear strength, and emitted light may be colored due to a residue of the catalyst used to introduce an acrylic skelton or an acrylic skelton.

The thickness of the protection layer is preferably 50 μm or more and 400 μm or less, more preferably 50 μm or more and 300 μm or less, and still more preferably 100 μm or more and 200 μm or less. The protection layer has a thickness of 50 μm or more and 400 μm or less, thereby a feeling of writing with a touch pen and sliding properties become very favorable, and operability and self-repairing properties are also excellent. When the thickness of the protection layer is less than 50 μm, a feeling of writing and self-repairing properties deteriorate. When the thickness of the protection layer is thicker than 400 μm, a feeling of writing, sliding properties, operability, and self-repairing properties deteriorate and it is difficult to perform molding with a uniform thickness. When the thickness is 50 μm or more and 400 μm or less, performance required for the surface protection film is exhibited in a well-balanced manner, and production is easy.

"Coating Layer"

The surface protection film of the present invention has a coating layer formed by curing an isocyanate compound on one surface of the protection layer. The coating layer is a layer positioned on the outermost surface of the surface protection film.

The coating layer is formed by applying a coating solution containing at least an isocyanate compound to the protection layer and reacting the isocyanate compound with water in the air, and performing curing. In addition, a part of the isocyanate compound in the paint penetrates into the protection layer and causes a crosslinking reaction with unreacted active hydrogen groups in the protection layer, and thus the coating layer and the protection layer are integrated by a covalent bond.

The solid content (weight %) of the coating solution is not particularly limited, and when the solid content is larger, a coating layer having excellent oil resistance tends to be obtained. This is thought to be caused by the fact that, when the amount of solvent is larger, a larger amount of isocyanate penetrates into the protection layer, the film thickness of the coating layer becomes thinner, and the barrier property deteriorates. The solid content of the coating solution is preferably 5 weight % or more, more preferably 10 weight % or more, and still more preferably 15 weight % or more. The upper limit value of the solid content of the coating solution is not particularly limited as long as coatability is satisfied, but is generally 30 weight % or less.

The thickness of the coating layer is preferably 1 μm or more and 50 μm or less, more preferably 2 μm or more and 40 μm or less, and still more preferably 3 μm or more and 30 μm or less. When the thickness of the coating layer is less than 1 μm, improvement in the oil resistance cannot be expected. On the other hand, even if the thickness of the coating layer exceeds 50 μm, further improvement in oil resistance cannot be expected, and high costs are incurred.

Isocyanate Compound

The isocyanate compound used in the coating layer is not particularly limited, and isocyanate compounds such as TDI, MDI, HDI, and IPDI, and a TMP modified type, biuret type, allophanate type, and isocyanurate type thereof can be exemplified. The isocyanate compounds can be used alone or two or more thereof can be used in combination. It is preferable to include a tri- or higher-functional isocyanate because the crosslink density can increase and improvement in oil resistance can be expected. In addition, it is more preferable to include an aromatic isocyanate in consideration of the oil resistance.

Inorganic Fine Particles

Inorganic fine particles can be mixed into the coating layer. Here, in the present invention, the inorganic fine particles are inorganic particles having an average particle diameter of 100 nm or less calculated from a specific surface area using a BET method (nitrogen) based on JIS Z8830: 2013. Regarding the inorganic fine particles, for example, silica particles, alumina particles, and the like can be used without particular limitation. In addition, either of solid particles and hollow particles can be used. In addition, particles whose surface has been treated can be used.

The oil resistance is improved as the proportion of the inorganic fine particles in the coating layer increases. However, when the amount of inorganic fine particles is larger, the film forming property of a paint containing an isocyanate compound and inorganic fine particles deteriorates, and the coating layer cannot be formed in some cases. The amount of inorganic fine particles mixed in is preferably 10 parts by weight or more and 150 parts by weight or less, more preferably 20 parts by weight or more and 100 parts by weight or less, and still more preferably 30 parts by weight or more and 60 parts by weight or less with respect to 100 parts by weight of the isocyanate compound.

"Transparent Substrate Film"

The transparent substrate film holds the protection layer. The material constituting the transparent substrate film can be used without particular limitation as long as it has excellent transparency, flexibility, and mechanical strength, and polyethylene terephthalate (PET), polyethylene naphthalate (PEN), polycarbonate (PC), cyclic olefin resin (COP), polyimide (PI), and the like can be suitably used.

The thickness of the transparent substrate film is preferably 50 µm or more and 500 µm or less. In the surface protection film of the present invention, a coefficient of thermal expansion of the polyurethane used to form the protection layer is generally higher than a coefficient of thermal expansion of the material constituting the transparent substrate film. Therefore, when the thickness of the transparent substrate film is less than 50 µm, the transparent substrate film may not withstand shrinkage of the protection layer at low temperatures, and the surface protection film may peel off from the transparent substrate. When the thickness of the transparent substrate film is thicker than 500 µm, the surface protection film becomes bulky and costs increase. In addition, when the transparent substrate film is adhered to a surface of touch panel type display, the operability is reduced. Here, as will be described below in detail in "Method of producing a protection layer," the protection layer can be directly molded on the transparent substrate film. When the production method is used, in order to prevent deformation due to heat when the material composition is thermally cured to form a protection layer, the transparent substrate film is preferably thick. However, even the values are beyond the above numerical value range, the values will not be excluded as long as they are not deviate from the spirit and scope of the present invention.

"Adhesive Agent Layer"

Adhesive agent layer is a layer for adhering the surface protection film on the transparent substrate on the display surface. The type of the adhesive agent is not particularly limited, and an acrylic-based resin, an epoxy-based resin, a urethane resin, a silicone-based resin and the like can be used. Among these, an acrylic-based resin can be attached to even a transparent substrate on which a surface treatment such as an antifouling treatment and a low reflection treatment is performed. In addition, a silicone-based resin has excellent wetting properties, and is unlikely to cause bubbles when it is attached to a transparent substrate, and has favorable removable properties, and is unlikely to leave an adhesive residue when peeled off. The thickness of the adhesive agent layer is generally within a range of 5 µm or more and 60 µm or less, and can be appropriately adjusted according to required specifications.

"Surface Protection Film"

In the surface protection film 10 according to the embodiment, four layers including the coating layer 1, the protection layer 2 formed of polyurethane, the transparent substrate film 3, and the adhesive agent layer 4 are laminated in that order. The surface protection film of the present invention can also include an intermediate layer for improving adhesion between each layer and a blue light cut layer for cutting blue light.

The total light transmittance of the surface protection film is preferably 90% or more. However, when a blue light cut ability to cut visible light in a blue range is provided, the total light transmittance is preferably 60% or more.

Figure 3:
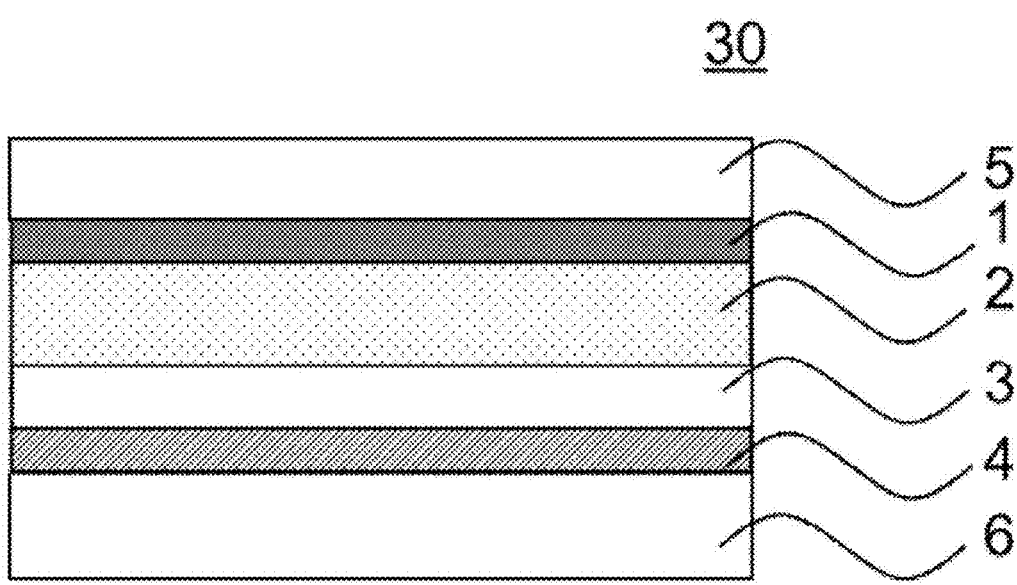
FIG. 3 is a diagram showing a surface protection film laminate.

In order to protect the surface protection film of the present invention from when it is produced until it is attached to the transparent substrate and used, a mold release film and a release film can be adhered to surfaces on the side of the coating layer and the side of the adhesive agent layer of the surface protection film respectively to obtain a surface protection film laminate. FIG. 3 shows a surface protection film laminate 30 in which a mold release film 5 and a release film 6 are adhered to the surface protection film 10 according to the embodiment. Here, in FIG. 3, the thicknesses of each layer do not reflect actual thicknesses.

The mold release film is provided to prevent contamination, adhesion of dust, scratches, and the like on the coating layer positioned on the outermost surface, and a film subjected to a mold release treatment on a surface on the side to be adhered on the coating layer is preferably used. When the mold release film on which a mold release treatment is performed is peeled off from the coating layer, a mold release agent contained in the mold release film is transferred to the surface of the coating layer, sliding properties can be imparted to the surface of the coating layer immediately after the mold release film is peeled off, and a touch operation can be performed without discomfort immediately after use thereof starts.

The release film prevents contamination, adhesion of dust, decrease in adhesive force, and the like of the adhesive agent layer. The release film is not particularly limited, and a film in which a mold release treatment is performed on the surface on the side to be adhered to the adhesive agent layer can be suitably used.

"Method of Producing Protection Layer"

The protection layer can be produced by pouring an uncured material composition to a gap between first and second gap maintaining members that are conveyed by a pair of rollers which are disposed apart from each other, introducing the material composition into a heating device while the material composition is held between the two gap maintaining members, and thermally curing the material composition to obtain a polyurethane. The material composition contains at least a polyol, an isocyanate (or a urethane prepolymer composed of these), and an alcohol-based curing agent.

Figure 4:
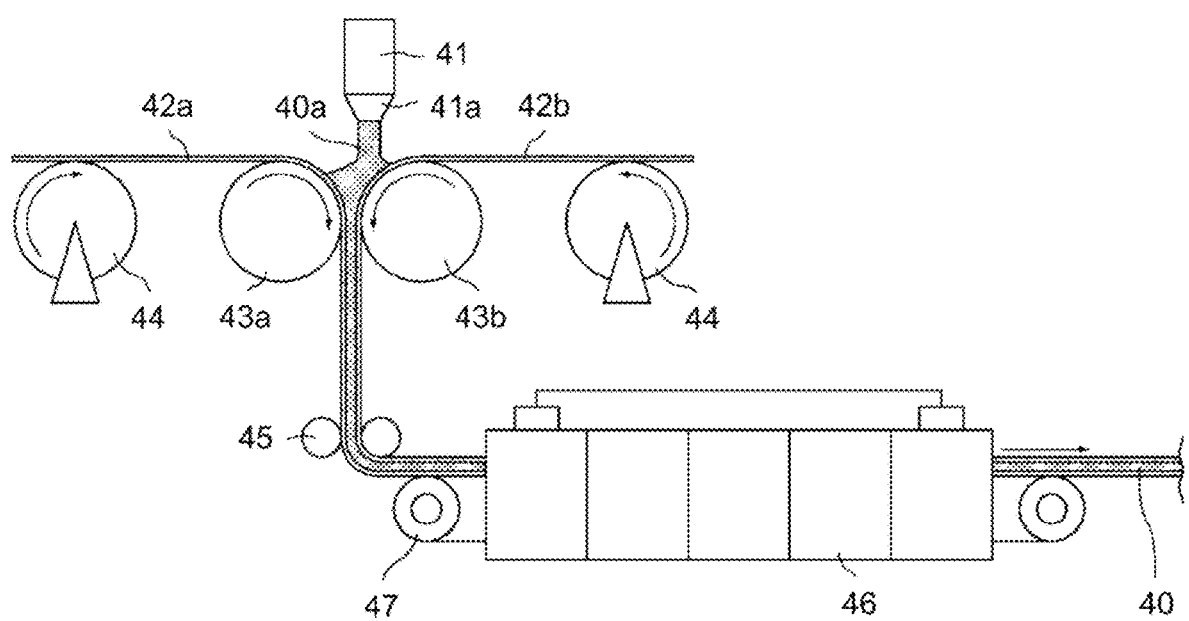
FIG. 4 is a diagram showing a method of producing a protection layer of a surface protection film.

FIG. 4 is a schematic view illustrating a method of producing a protection layer. Hereinafter, the method of producing a protection layer will be described with reference to FIG. 4.

A material composition 40a is poured to a gap between first and second gap maintaining members 42a and 42b that are conveyed by a pair of transport rollers 43a and 43b which are disposed apart from each other through a casting machine 41. The first and second gap maintaining members 42a and 42b are introduced into a heating device 46 while holding the material composition 40a therebetween. The material composition 40a is thermally cured while the material composition 40a is held between the first and second gap maintaining members 42a and 42b, and thereby a polyurethane sheet-like article 40 is obtained.

Here, in FIG. 4, 44 indicates a transport roller for conveying the first and second gap maintaining members 42a and 42b, 45 indicates an auxiliary roller, and 47 indicates a conveyor belt through which the first and second gap maintaining members 42a and 42b that hold the material composition 40a therebetween are transported into the heating device 46.

The first and second gap maintaining members 42a and 42b can be used without particular limitation as long as they are materials that do not thermally deform when the material composition is thermally cured. For example, an elongated film made of a polymer material such as polyethylene terephthalate (PET), polyethylene naphthalate (PEN), polycarbonate (PC), a cyclic olefin resin (COP), or polyimide (PI) can be used. Here, in the schematic view shown in FIG. 4, an elongated film made of a polymer material is used as a gap maintaining member. However, an endless belt made of such a polymer material or a metal material such as aluminum can be used.

Since the first and second gap maintaining members 42a and 42b are pulled at the same tension and transported while the material composition 40a is held therebetween, a gap therebetween can be maintained at a constant size. The material composition 40a is interposed between the first and second gap maintaining members 42a and 42b and is cured while a constant thickness is maintained, and thereby a polyurethane sheet-like article 40 having excellent thickness accuracy is obtained. According to the production method, it is possible to continuously mold the sheet-like article 40 having a thickness of 50 µm or more, which is not easily applied by coating, and having practical optical characteristics as a protection layer of the surface protection film.

A position of a head part 41a of the casting machine 41 is preferably unevenly located on the side of one of the transport rollers rather than at the center of the transport rollers 43a and 43b (the center of the gap formed by the first and second gap maintaining members 42a and 42b), and an unevenly distributed distance is preferably equal to or less than the radius of the transport roller. That is, a part directly below the head part 41a of the casting machine 41 is preferably positioned between the center of the pair of transport rollers 43a and 43b and the central axis of one transport roller. In addition, the shortest distance between a tip of the head part 41a and the surface of the transport roller is preferably 5 cm or less. By providing the head part 41a in this manner, thickness accuracy of the polyurethane sheet-like article 40 will be further improved, bubbles are unlikely to enter the uncured material composition 40a poured to the gap between the first and second gap maintaining members 42a and 42b, and entrained bubbles can easily escape.

The transport rollers 43a and 43b may simply have only a transport function, but is preferably heating rollers. When the transport rollers are heating rollers, curing of the material composition 40a can start immediately once the material composition 40a is held in the gap between the first and second gap maintaining members 42a and 42b, it is possible to maintain the thickness more uniformly until the material composition 40a is introduced into the heating device 46, and it is possible to mold the polyurethane sheet-like article 40 having superior thickness accuracy. When the transport rollers 43a and 43b are heated, a transport surface temperature is preferably set to 10° C. or higher and 60° C. or lower. When the temperature is lower than 10° C., the viscosity of the material composition 40a increases, bubbles cannot easily escape, a curing reaction occurs slowly, and the thickness accuracy of the sheet-like article 40 decreases. When the temperature exceeds 60° C., the material composition 40a may be cured on the transport roller, or bubbles may enter the sheet-like article 40.

The heating device 46 is a heating furnace including a heater, and may be a device that can increase the temperature in the furnace to a curing temperature of the material composition 40a. In addition, heating conditions (curing conditions) in the heating device 46 are not particularly limited, and may be appropriately set according to a composition of the material composition 40a. For example, conditions of 40° C. or higher and 160° C. or lower, and 1 minute or longer and 180 minutes or shorter may be set.

An elongated laminate including the first gap maintaining member 42a, the polyurethane sheet-like article 40, and the second gap maintaining member 42b is conveyed from the heating device 46. Then, the sheet-like article 40 of the elongated laminate becomes the protection layer of the surface protection film of the present invention.

"Method of Producing Surface Protection Film Laminate"

In the production method, one of the first gap maintaining member 42a and the second gap maintaining member 42b is peeled off when the coating layer is formed on the surface of the protection layer. In addition, the other of the first gap maintaining member 42a and the second gap maintaining member 42b can serve as a transparent substrate film of the surface protection film. Hereinafter, a case in which the first gap maintaining member 42a serves as a transparent substrate film will be exemplified.

According to the production method, an elongated laminate formed of the first gap maintaining member 42a serving as a transparent substrate film, the polyurethane sheet-like article 40 serving as a protection layer, and the second gap maintaining member 42b is conveyed out. In this case, preferably, a film on which no mold release treatment is performed is used as the first gap maintaining member 42a serving as a transparent substrate film, and a film on which a mold release treatment is performed is used as the second gap maintaining member 42b.

Formation of Coating Layer

The second gap maintaining member 42b of the elongated laminate conveyed from the heating device is peeled off, a coating solution containing a polyisocyanate compound is applied to an exposed surface of the protection layer, and the isocyanate compound is cured to form a coating layer. The isocyanate compound is left under an environment of room temperature to 120° C. for 5 minutes to 24 hours, and cured. In this case, in order to accelerate a curing reaction, a catalyst can be added to the coating solution. After the coating layer is cured and formed, in order to prevent contamination, adhesion of dust, scratches, and the like on the coating layer, a mold release film subjected to a mold release treatment is preferably adhered.

Formation of Adhesive Agent Layer

Next, an adhesive agent layer is formed on the surface on the side of the first gap maintaining member 42a by coating or the like, a release film is adhered on the adhesive agent layer, and thereby an elongated surface protection film laminate 30 can be obtained.

Here, the above method of producing a surface protection film laminate is an example, and for example, a coating layer can be formed after the adhesive agent layer is formed. In addition, a laminate in which the transparent substrate film/the adhesive agent layer/the release film are laminated in that order can be used as the first gap maintaining member 42a. In addition, a film having unevenness is used as the second gap maintaining member 42b and the material composition 40a is held on the surface having unevenness, thereby the unevenness are transferred to the outermost surface of the sheet-like article 40, and the coating layer can be formed on the uneven surface.

According to this production method, the surface protection film laminate 30 can be continuously produced in a so-called roll to roll manner. Since the produced surface protection film laminate 30 includes the mold release film 5 and the release film 6 on both surfaces, it can prevent scratches, contamination, and the like on the surface protection film, and it has excellent handling properties. Here, as described above, the surface protection film laminate can be produced throughout in a roll to roll manner, but the coating layer and the adhesive agent layer can be formed after cutting.

The surface protection film laminate may be wound in a roll form and be shipped or the surface protection film laminate may be cut into a sheet form and be shipped. In addition, an elongated laminate formed of the first gap maintaining member 42a, the polyurethane sheet-like article 40, and the second gap maintaining member 42b, or a sheet-like laminate obtained by cutting the elongated laminate can be shipped, and the coating layer and the adhesive agent layer can be formed in a display factory or the like.

Here, the production method is an example, for example, and the protection layer produced in the above "Method of producing protection layer" and a sheet-like or roller-like transparent substrate film can be adhered for production.

EXAMPLES

The present invention will be described below in further detail with reference to examples, and the present invention is not merely limited to these examples.
"Production of Protection Layer"

100 g of a poly(1,6-hexane carbonate)diol (product name: 980R, produced by Tosoh Corporation) with a molecular weight of 2,000 and a hydroxyl value of 55, 48.0 g of isophorone diisocyanate, 16.0 g of an alcohol-based curing agent with a weight ratio of 1,4-butanediol/trimethylolpropane=60/40 (a ratio=1.05), and 250 ppm of an organotin compound as a non-amine catalyst were added, stirred and mixed to prepare a material composition.

A PET having unevenness on a silicone-treated surface and a thickness of 125 μm was used as a mold release film, a PET having a thickness of 100 μm was used as a transparent substrate film, and according to the molding method, a laminate including a protection layer made of polycarbonate polyurethane and having unevenness on the surface (with a thickness of 150 μm, anti-glare) and the transparent substrate film was produced.

The obtained laminate was cut into a size of 10 cm×15 cm to obtain an anti-glare sample for forming a coating layer.

Example 1

2 g of an isocyanate (44v-20, produced by Covestro AG, polyfunctional (polymeric type), aromatic), and 13.3 g of MEK were weighed out and mixed to prepare a coating solution. Then, it was applied with a bar using a 50 μm shim tape and dried at 100° C. for 12 hr.

Example 2

5 g of MEK-ST-40 (nano silica dispersion, produced by Nissan Chemical Corporation: average particle diameter of 12 nm), 2.73 g of an isocyanate (44v-20, produced by Covestro AG), and 19 g of MEK were weighed out and mixed to prepare a coating solution. Then, it was applied with a bar using a 50 μm shim tape and dried at 100° C. for 12 hr.

Example 3

5 g of MEK-ST-40 (nano silica dispersion, produced by Nissan Chemical Corporation), 1.59 g of an isocyanate (44v-20, produced by Covestro AG), and 12 g of MEK were weighed out and mixed to prepare a coating solution. Then, it was applied with a bar using a 50 μm shim tape and dried at 100° C. for 12 hr.

Example 4

5 g of MEK-ST-40 (nano silica dispersion, produced by Nissan Chemical Corporation), 2.73 g of an isocyanate (44v-20, produced by Covestro AG), and 30 g of MEK were weighed out and mixed to prepare a coating solution. Then, it was applied with a bar using a 50 μm shim tape and dried at 100° C. for 12 hr.

Example 5

5 g of MEK-ST-40 (nano silica dispersion, produced by Nissan Chemical Corporation), 1.59 g of an isocyanate (44v-20, produced by Covestro AG), and 19 g of MEK were weighed out and mixed to prepare a coating solution. Then, it was applied with a bar using a 50 μm shim tape and dried at 100° C. for 12 hr.

Example 6

5 g of MEK-ST-40 (nano silica dispersion, produced by Nissan Chemical Corporation), 2.73 g of an isocyanate (44v-20, produced by Covestro AG), and 65 g of MEK were weighed out and mixed to prepare a coating solution. Then, it was applied with a bar using a 50 μm shim tape and dried at 100° C. for 12 hr.

Example 7

5 g of MEK-ST-40 (nano silica dispersion, produced by Nissan Chemical Corporation), 2.73 g of an isocyanate (N3300, produced by Covestro AG, trifunctional, isocyanurate), and 19 g of MEK were weighed out and mixed to prepare a coating solution. Then, it was applied with a bar using a 50 μm shim tape and dried at 100° C. for 12 hr.

Comparative Example 1

5 g of MEK-ST-40 (nano silica dispersion, produced by Nissan Chemical Corporation), 0.68 g of an isocyanate (44v-20, produced by Covestro AG), and 5.6 g of MEK were weighed out and mixed to prepare a coating solution. Then, it was applied with a bar using a 50 μm shim tape and dried at 100° C. for 12 hr.

Comparative Example 2

5 g of MEK-ST-40 (nano silica dispersion, produced by Nissan Chemical Corporation), 0.23 g of an isocyanate (44v-20, produced by Covestro AG), and 2.5 g of MEK were weighed out and mixed to prepare a coating solution. Then, it was applied with a bar using a 50 μm shim tape and dried at 100° C. for 12 hr.

Comparative Example 3

An anti-glare sample on which no coating layer was formed was used without change.

The oil resistance of the above produced each surface protection film was evaluated as follows. The results are shown in Table 1.
Oil Resistance One drop of oleic acid and a commercially available emulsion (emulsion for balance skin, produced by Ryohin Keikaku Co., Ltd.) was added dropwise to the coating layer or the protection layer. One day, three days, and seven days after the dropwise addition, all of the oleic acid and the emulsion were wiped off, the part on which dropping was performed was visually confirmed, and evaluation was performed based on the following criteria.

5: No contact mark
4: An outline was visible in a reflection
3: An outline was slightly visible
2: An outline was clearly visible
1: Swelling

TABLE 1

| | Example | | | | | | | Comparative Example | | |
|---|---|---|---|---|---|---|---|---|---|---|
| | 1 | 2 | 3 | 4 | 5 | 6 | 7 | 1 | 2 | 3 |
| Isocyanate | 44V20 | 44V20 | 44V20 | 44V20 | 44V20 | 44V20 | N3300 | 44V20 | 44V20 | — |
| Nano silica | — | MEK-ST | MEK-ST | MEK-ST | MEK-ST | MEK-ST | MEK-ST | MEK-ST | MEK-ST | — |
| Nano silica parts by mass (vs isocyanate) | — | 35 | 49 | 35 | 49 | 35 | 35 | 69 | 87 | — |
| Solid content of coating solution (wt %) | 15 | 15 | 15 | 10 | 10 | 5 | 15 | 15 | 15 | — |
| 1st day | | | | | | | | Film defect | Film defect | |
| Oleic acid | 4 | 5 | 5 | 5 | 5 | 4 | 5 | — | — | 4 |
| Emulsion | 4 | 5 | 5 | 5 | 5 | 4 | 5 | — | — | 3 |
| 3rd day | | | | | | | | | | |
| Oleic acid | 4 | 5 | 5 | 5 | 5 | 4 | 4 | — | — | 3 |
| Emulsion | 4 | 5 | 5 | 5 | 5 | 4 | 4 | — | — | 3 |
| 7th day | | | | | | | | | | |
| Oleic acid | 4 | 5 | 5 | 5 | 5 | 4 | 4 | — | — | 3 |
| Emulsion | 4 | 5 | 5 | 5 | 5 | 4 | 4 | — | — | 3 |

Examples 1 to 7 having the coating layer of the present invention had excellent oil resistance.

The coating layer containing inorganic fine particles had superior oil resistance, and as the solid content of the coating solution was higher, the oil resistance was excellent. In addition, aromatic isocyanates had more excellent oil resistance than aliphatic (isocyanurate type) isocyanates.

In Comparative Examples 1 and 2, the coating film was cracked and the coating layer could not be formed.

The invention claimed is:

1. A surface protection film having a coating layer consisting of a cured product obtained by reacting only an isocyanate compound, based on a polymeric MDI (di-phenylmethane-4,4'-di-isocyante) and inorganic fine particles with water in air, on one surface of a protection layer formed of polyurethane,
wherein the coating layer is positioned on an outermost surface of the surface protection film and is cured by water in air,
wherein the coating layer consists of the cured product obtained by reacting only the isocyanate compound, based on the polymeric MDI, and the inorganic fine particles with the water in the air, and the inorganic fine particles are silica particles with a particle size of 100 nm or less, wherein the protection film and the coating layer form a cross-linked structure by having a part of the isocyanate compound, based on the polymeric MDI, of the coating layer penetrate into the protection film and react with unreacted active hydrogen groups in the protection film, and
wherein an amount of the inorganic fine particles is 20 parts by weight or more and 60 parts by weight or less with respect to 100 parts by weight of the isocyanate compound, based on the polymeric MDI.

2. The surface protection film according to claim 1, wherein a transparent substrate film formed of a resin other than polyurethane is provided on the other surface of the protection layer.

3. The surface protection film according to claim 1, wherein the polyurethane is polycarbonate polyurethane or polyester polyurethane.

4. The surface protection film according to claim 1, wherein the protection layer has a thickness of 50 μm or more and 400 μm or less.

5. A surface protection film laminate in which a mold release film is laminated on the surface on the side of the coating layer of the surface protection film according to claim 1 and a release film is laminated on the other surface.

6. A method of producing a surface protection film in which at least two layers including a coating layer consisting of a cured product obtained by reacting only an isocyanate compound, based on a polymeric MDI (di-phenylmethane-4,4'-di-isocyante) and inorganic fine particles with water in air, and a protection layer formed of polyurethane are laminated in that order, wherein the method includes:
pouring a material composition into a gap between first and second gap maintaining members that are continuously conveyed by a pair of rollers which are disposed apart from each other;
thermally curing the material composition while the material composition is held between the first and second gap maintaining members to form the protection layer; and
peeling off one of the first and second gap maintaining members, applying a coating solution containing the isocyanate compound, based on the polymeric MDI and the inorganic fine particles, to an exposed surface of the protection layer, and curing the isocyanate compound, based on the polymeric MDI, to form a coating layer,
wherein the coating layer is positioned on an outermost surface of the surface protection film and is cured by water in air,
wherein the protection film and the coating layer form a cross-linked structure by having a part of the isocyanate compound, based on the polymeric MDI, of the coating layer penetrate into the protection film and react with unreacted active hydrogen groups in the protection film,
wherein the coating layer consists of the cured product obtained by reacting only the isocyanate compound, based on the polymeric MDI, and the inorganic fine particles with the water in the air, and the inorganic fine particles are silica particles with a particle size of 100 nm or less, and
wherein an amount of the inorganic fine particles is 20 parts by weight or more and 60 parts by weight or less with respect to 100 parts by weight of the isocyanate compound, based on the polymeric MDI.

7. The method of producing a surface protection film according to claim 6,
   wherein the other of the first and second gap maintaining members is a film on which no mold release treatment is performed, and one thereof is a film on which a mold release treatment is performed.

8. The method of producing a surface protection film according to claim 6,
   wherein one of the first and second gap maintaining members is a film having unevenness, and holding the material composition by the surface having the unevenness.

* * * * *